Patented Mar. 27, 1951

2,546,841

UNITED STATES PATENT OFFICE 2,546,841

AMINO-ALDEHYDE RESIN PLASTICIZED WITH A POLYVINYL ACETAL AND A FLOW-PROMOTING SECONDARY PLASTICIZER

Henry P. Wohnsiedler, Darien, and William S. Sloatman, Jr., Stamford, Conn., assignors to American Cyanamid Company, New York, N. Y., a corporation of Maine No Drawing. Application July 19, 1946, Serial No. 684,782

12 Claims. (Cl. 260—32.6)

This invention relates to molding and laminating compositions; and, it particularly relates to thermosetting resins having a plasticized thermoplastic resin incorporated therein.

The thermosetting resins suitable for use in this invention are the condensation reaction products resulting from reacting an aldehyde with an amino compound, such as urea, melamine, etc. Suitable thermoplastic resins having utility in this invention are the polyvinyl resins, particularly the polyvinyl-acetal resins. These thermoplastic resins are viewed as primary plasticizers for the thermosetting resins. Secondary plasticizers, compatible with both resins, are employed with these primary plasticizers. Among the materials suitable as secondary plasticizers, there may be mentioned the group functioning as flow promoter, particularly o-cresyl glycerine ether, benzamide and acrylamide.

The incorporation of plasticizers into an amino resin such as melamine formaldehyde in a thoroughly homogeneous way such as in a molding composition may be effected in several ways. The preferred methods of blending, however, are as follows:

(1) Blending the primary and secondary plasticizers at an elevated temperature of 150°–155° C., as in a Banbury mixer, followed by blending with the thermosetting resin and polymerization on heated differential rolls, and (2) Dry blending plasticizers and thermosetting resin and polymerizing on differential rolls by controlling the temperature of the rolls.

The invention is more clearly set forth in the following examples, given by way of illustration and not in limitation.

Example 1

A molding composition was prepared in two steps by first blending 25 parts polyvinyl butyral known as Vinylite XYNC (Carbide and Carbon Chemicals Corp.), and 10 parts cresyl glyceryl ether in a Banbury mixer at 150° C., cooling the mixture and cold sheeting it. This plasticizer mixture was then blended with 65 parts melamine-formaldehyde resin (1:2 molar ratio) and 1 part zinc stearate for 14 minutes on differential rolls heated at 130° C. fast and 90° C. slow. After this time all components were well dispersed, and the plasticity had changed to a stiffer flow suitable for molding. The composition was removed from the rolls in the form of a sheet, which was cooled and granulated.

This composition was molded at 155° C. and 3600 p. s. i. for 15 minutes into various articles including a number with large metallic inserts. The molded products had increased toughness, flexibility and impact strength, and improved craze and crack resistance in comparison with the unplasticized composition.

Example 2

A composition was prepared by dry blending 25 parts polyvinyl butyral, 10 parts o-cresyl glyceryl ether, 65 parts melamine-formaldehyde resin in (1:2 ratio) and 1 part zinc stearate. This was transferred and held for 27 minutes on differential rolls heated at 120° C. fast and 65° C. slow. The composition was removed in the form of a sheet and granulated.

When this granulated composition was molded as described in Example 1, products were obtained comparable in properties to those obtained with the composition compounding according to the teachings of that example.

Example 3

A dry mixture comprising 65 parts of melamine-formaldehyde resin, 25 parts of polyvinyl butyral, 10 parts of acrylamide, and 1 part of zinc stearate was charged to differential rolls heated at 130° C. fast and 65° C. slow and blended for 20½ minutes. The resultant composition was removed in sheet form, cooled, and granulated. The granular molding composition was molded around metallic inserts and formed into various molded articles at 155° C. and 3600 p. s. i. for 20 minutes. The white, homogeneous molded articles obtained in this manner were tough and flexible, possessed increased crack and craze resistance, and exhibited increased impact strength.

Example 4

A molding composition, yielding products having properties comparable to those given in the above examples, was prepared by charging a mixture of 65 parts of melamine-formaldehyde resin, 25 parts of polyvinyl butyral, 10 parts of benzamide, and 1 part of zinc stearate to differential rolls heated at 120° C. for 20½ minutes, after which the composition was removed in sheet form, and granulated upon cooling.

Example 5

A filler reinforced molding composition was prepared by rough blending in a "W. P." mixer 35 parts of cut cellulose pulp, 53 parts melamine-formaldehyde resin, 6 parts of polyvinyl butyral, 6 parts of o-cresyl glyceryl ether, and 1 part of zinc stearate. The blend was then fed onto differential rolls heated at 120° C. fast and 65° C.

slow and blended for 6½ minutes. The composition was removed therefrom as a sheet, cooled and granulated. This molding composition yielded excellent molded products having increased impact strength, and improved toughness and resistance to cracking in comparison with the unplasticized composition.

Satisfactory results have been obtained with polyvinyl acetals other than the butyral, among which there may be mentioned polyvinyl formal and polyvinyl acetal. Polyvinyl butyral, however, has given results far superior to any of these or others tried. By like token, other amino-aldehyde plastics have given satisfactory products, but the melamine formaldehyde resins yielded, with plasticized polyvinylbutyral, products superior to those obtained by any other combination of these ingredients.

Experimentation has indicated that the amount of primary plasticizer, polyvinyl acetal, should be less than 30% of the resin composition and the amount of secondary plasticizer should be more than 20% of the amount of primary plasticizer to yield satisfactory products. Optimum results have been obtained, however, when the amount of primary plasticizer is 10 to 25% of the resin composition, and the amount of secondary plasticizer is 30 to 40% of the amount of primary plasticizer.

In order to realize the fullest benefit in improved properties of toughness from the plasticizers described, it is necessary that they be dispersed intimately and become a continuous part of the amino resin. To achieve this, it is desirable that the final blending and polymerization be carried out within the temperature range at which the primary plasticizer softens. This temperature is usually higher than that at which melamine formaldehyde and other amino resins can be safely processed. Therefore, to avoid the use of excessively high temperatures in processing the softening temperature of the thermoplastic is lowered by the addition of secondary plasticizer as described either by a preblending operation or by blending primary and secondary plasticizers with the amino resin in a single hot roll blending stage.

Melamine and other amino resins which are suitable for the purposes of this invention comprise those which are fusible at temperatures up to 145° C. and preferably in the region of 110 to 135° C. and which have a degree of reactivity, permitting the hot blending and working of plasticizing components therewith within a reasonable period. Resins having molar ratios of formaldehyde to melamine of 1.5:1 to 4:1 are suitable for this purpose, however, the preferred ratio is 2 to 3 mols of formaldehyde per mol of melamine.

Thermoplastic resins of the polyvinyl-acetal type are normally derived by reaction of a polyvinyl alcohol with an aldehyde such as butyraldehyde, acetaldehyde or formaldehyde. In addition to the acetal grouping, free hydroxyl groups are also present in the resins, and these are believed to contribute to their compatibility with the amino resin. There is some likelihood that co-reaction between the amino resin and the primary plasticizer takes place to a limited extent. However, the invention is not limited to any specific type or degree of chemical reaction, since it will be apparent to one skilled in the art that within the scope of the composition described, various modifications of materials or blending procedures can be used.

In addition to alpha cellulose, other fillers may also be used such as wood flour, asbestos, fabric cuttings, glass fibers, etc. Coloring agents may be added as well as curing agents, retarders or other lubricants to achieve special effects.

We claim:

1. A molding composition comprising a melamine-formaldehyde resin plasticized with a compatible polyvinyl acetal selected from the group consisting of polyvinyl formal, polyvinyl acetal, and polyvinyl butyral and a flow promoting secondary plasticizer compatible with both said resin and acetal and selected from the group consisting of ortho-cresyl glyceryl ether, benzamide and acrylamide, said polyvinyl acetal being present in an amount from 10–30% based on the resin composition, said secondary plasticizer being present in an amount from 20–40% based on said acetal, said melamine-formaldehyde resin having been prepared by reacting reactants consisting essentially of melamine and formaldehyde in mol ratios of from 1:1.5 to 1:4, respectively, and said melamine-formaldehyde resin being fusible at temperatures up to 145° C.

2. A molding composition comprising a melamine-formaldehyde resin, polyvinyl butyral constituting 10–30% of the composition and a compatible flow promoting secondary plasticizer selected from the group consisting of ortho-cresyl glyceryl ether, benzamide and acrylamide, said secondary plasticizer being present in an amount from 20–40% of the amount of polyvinyl butyral, and said melamine-formaldehyde resin having been prepared by reacting reactants consisting essentially of melamine and formaldehyde in mol ratios of from 1:1.5 to 1:4, respectively, and said melamine-formaldehyde resin being fusible at temperatures up to 145° C.

3. A process for dry blend plasticizing a thermosetting composition which comprises milling on heated differential rolls a melamine-formaldehyde resin and a compatible polyvinyl acetal selected from the group consisting of polyvinyl formal, polyvinyl acetal, and polyvinyl butyral with a flow promoting secondary plasticizer selected from the group consisting of ortho-cresyl glyceryl ether, benzamide and acrylamide, said acetal being present in an amount varying between 10–30% by weight based on the weight of the resin composition, said secondary plasticizer being present in an amount varying between 20–40% by weight based on the weight of said acetal, and said melamine-formaldehyde resin having been prepared by reacting reactants consisting essentially of melamine and formaldehyde in mol ratios of from 1:1.5 to 1:4, respectively, and said melamine-formaldehyde resin being fusible at temperatures up to 145° C.

4. A process for plasticizing a thermosetting resinous composition comprising blending at elevated temperatures, a polyvinyl acetal selected from the group consisting of polyvinyl formal, polyvinyl acetal, and polyvinyl butyral, said acetal being present in an amount between 10 and 30% by weight based on the total weight of the composition, and a compatible flow promoting plasticizer selected from the group consisting of ortho-cresyl glyceryl ether, benzamide and acrylamide, said plasticizer being present in an amount between 20% and 40% by weight based on the weight of the acetal, thereafter blending the resulting plasticized acetal with a melamine-formaldehyde resin by milling on heated differential rolls, wherein said melamine-formaldehyde resin is prepared by reacting reactants consisting essentially of melamine and formaldehyde in mol ratios of from 1:1.5 to 1:4, respectively, and said melamine-formaldehyde resin being fusible at temperatures up to 145° C.

5. A process for plasticizing a thermosetting resinous composition comprising dry blending melamine-formaldehyde resin with 10-30% by weight of polyvinyl butyral based on the total weight of the resinous composition and 20-40% by weight of ortho-cresyl ether based on said butyral and milling the dry blended ingredients on heated differential rolls, wherein said melamine-formaldehyde resin is prepared by reacting reactants consisting essentially of melamine and formaldehyde in mol ratios of from 1:1.5 to 1:4, respectively, and said melamine-formaldehyde resin is fusible at temperatures up to 145° C.

6. A process for plasticizing a thermosetting resinous composition comprising dry blending a melamine-formaldehyde resin with 10-30% by weight of polyvinyl butyral based on the total weight of the resinous composition and 20-40% by weight of ortho-cresyl glyceryl ether based on said butyral and milling the dry blended ingredients on heated differential rolls, wherein said melamine-formaldehyde resin is prepared by reacting reactants consisting of melamine and formaldehyde in mol ratios of from 1:1.5 to 1:4, respectively, and said melamine-formaldehyde resin is fusible at temperatures between 110-135° C.

7. A melamine-formaldehyde resin plasticized with 10%-30% by weight of polyvinyl butyral based on the total weight of the resin composition and 20-40% by weight of ortho-cresyl glyceryl ether based on the butyral, wherein said melamine-formaldehyde resin is prepared by reacting reactants consisting essentially of melamine and formaldehyde in mol ratios of from 1:1.5 to 1:4, respectively, and said melamine-formaldehyde resin is fusible at temperatures up to 145° C.

8. A melamine-formaldehyde resin plasticized with 10%-30% by weight of polyvinyl butyral based on the total weight of the resinous composition and 20-40% by weight of benzamide based on the butyral, wherein said melamine-formaldehyde resin is prepared by reacting reactants consisting essentially of melamine and formaldehyde in mol ratios of from 1:1.5 to 1:4, respectively, and said melamine-formaldehyde resin is fusible at temperatures up to 145° C.

9. A thermosetting resinous composition comprising a melamine-formaldehyde resin plasticized with 10-30% by weight of polyvinyl butyral based on the total weight of the resinous composition and 20%-40% by weight of acrylamide based on the butyral, wherein said melamine-formaldehyde resin is prepared by reacting reactants consisting essentially of melamine and formaldehyde in mol ratios of from 1:1.5 to 1:4, respectively, and said melamine-formaldehyde resin is fusible at temperatures up to 145° C.

10. A melamine-formaldehyde resin plasticized with 10-30% by weight of polyvinyl acetal based on the total weight of the resinous composition and 20-40% by weight of benzamide based on the acetal, wherein said melamine-formaldehyde resin is prepared by reacting reactants consisting essentially of melamine and formaldehyde in mol ratios of from 1:1.5 to 1:4, respectively, and said melamine-formaldehyde resin is fusible at temperatures up to 145° C.

11. A melamine-formaldehyde resin plasticized with 10%-30% by weight of polyvinyl acetal based on the total weight of the resinous composition and 20-40% by weight of ortho-cresyl glyceryl ether based on the weight of acetal, wherein said melamine-formaldehyde resin is prepared by reacting reactants consisting essentially of melamine and formaldehyde in mol ratios of from 1:1.5 to 1:4, respectively, and said melamine-formaldehyde resin is fusible at temperatures up to 145° C.

12. A melamine-formaldehyde resin plasticized with 10-30% by weight of polyvinyl formal based on the total weight of the resinous composition and 20-40% by weight of ortho-cresyl glyceryl ether based on the weight of the formal, wherein said melamine-formaldehyde resin is prepared by reacting reactants consisting essentially of melamine and formaldehyde in mol ratios of from 1:1.5 to 1:4, respectively, and said melamine-formaldehyde is fusible at temperatures up to 145° C.

HENRY P. WOHNSIEDLER.
WILLIAM S. SLOATMAN, Jr.

REFERENCES CITED

The following references are of record in the file of this patent:

UNITED STATES PATENTS

| Number | Name | Date |
|---|---|---|
| Re. 22,402 | Swain | Dec. 7, 1943 |
| 2,320,816 | D'Alelio | June 1, 1943 |
| 2,374,067 | Alderson | Apr. 17, 1945 |
| 2,376,511 | Saunders | May 22, 1945 |
| 2,409,548 | Debacher | Oct. 15, 1946 |
| 2,413,860 | Brookes | Jan. 7, 1947 |
| 2,416,182 | Kistler | Feb. 18, 1947 |

FOREIGN PATENTS

| Number | Country | Date |
|---|---|---|
| 552,152 | Great Britain | Mar. 25, 1943 |